United States Patent [19]

Koizumi

[11] Patent Number: 5,746,524
[45] Date of Patent: May 5, 1998

[54] PRINTING CONTROL APPARATUS FOR SPACING 1-BYTE AND 2-BYTE CHARACTERS

[75] Inventor: Hirotaka Koizumi, Tokyo, Japan

[73] Assignee: NEC Corporation, Tokyo, Japan

[21] Appl. No.: 712,885

[22] Filed: Sep. 12, 1996

[30] Foreign Application Priority Data

Sep. 13, 1995 [JP] Japan ................................ 7-235090

[51] Int. Cl.⁶ ............................................. B41J 19/32
[52] U.S. Cl. ..................... 400/306; 400/110; 395/110
[58] Field of Search ........................... 400/109, 110, 400/9, 10, 61, 76, 303, 304, 306; 395/108, 109, 110, 150

[56] References Cited

U.S. PATENT DOCUMENTS

| 4,707,153 | 11/1987 | Nishi et al. ........................ 101/93.04 |
| 4,727,511 | 2/1988 | Sekiguchi ............................ 400/110 |
| 4,740,093 | 4/1988 | Malcolm ............................ 400/306 |
| 5,205,660 | 4/1993 | Momose ............................. 400/304 |
| 5,383,730 | 1/1995 | Takahashi ............................ 400/76 |
| 5,501,538 | 3/1996 | Sawada et al. ....................... 400/304 |
| 5,609,427 | 3/1997 | Takasawa et al. .................... 400/304 |
| 5,623,593 | 4/1997 | Spells, III ........................... 400/304 |

FOREIGN PATENT DOCUMENTS

| 121441 | 7/1983 | Japan ............................... 400/110 |
| 163424 | 7/1986 | Japan ............................... 400/110 |
| 304723 | 12/1988 | Japan ............................... 400/110 |
| 3-48325 | 3/1991 | Japan ............................... 400/110 |

*Primary Examiner*—Edgar S. Burr
*Assistant Examiner*—Steven S. Kelley
*Attorney, Agent, or Firm*—Young & Thompson

[57] ABSTRACT

In a printer that normally prints 1-byte characters as well as 2-byte characters in such a manner that a size of a 2-byte character is smaller than twice the size of a 1-byte character, a device and method for adjusting an interval between 1-byte character and a 2-byte character so that the printed size of the 2-byte character containing this character interval is twice the size of the 1-byte character.

18 Claims, 2 Drawing Sheets

PRINTING CONTROL APPARATUS FOR SPACING 1-BYTE AND 2-BYTE CHARACTERS

BACKGROUND OF THE INVENTION

1. Field of the Invention

The present invention generally relates to a printer printing control apparatus, a printer printing control method, and a storage medium for storing a printer printing control program used in a printer capable of printing 1-byte characters and 2-byte characters in a mixed form with a size (dimension) ratio of 1:n (n<2). The present invention is directed to such printer printing control apparatus/method, and to such a medium for storing a printer printing control program, by which a printing operation is controlled in a way that these 1-byte characters and 2-byte characters are printed in the mixed form, while an apparent (virtual) size ratio involving character intervals between the 1-byte characters and the 2-byte characters is set to 1:2.

2. Description of the Related Art

Japanese Kokai No. 3-48325 describes the below-mentioned printing technique for such a printer that 1-byte characters and 2-byte characters are printed with the size ratio of 1:n (n<2). That is, in this printer, the data in the source file where the 1-byte characters and the 2-byte characters are mixed with the size ratio of 1:2 are printed having the same number of characters as those of this source file per 1 line. This printing operation is carried out in the following sequence:

1) The data for 1 line where the 1-byte characters and the 2-byte characters are mixed with each other is read from the source file, and then the read data is outputted to the output buffer.

2) The quantity of these 2-byte characters contained in this data for 1 line is counted.

3) Based upon the size ratio (1:n) of the 1-byte character to the 2-byte character, the number of columns is calculated which should be shifted when this 2-byte character is printed.

4) The output position of the data for the next line with respect to the output buffer is shifted by this calculated column number.

However, the above-described conventional printing technique is inefficient since the number of 2-byte characters contained in 1 line on the source file must be counted, and also the quantity of columns to be shifted must be calculated.

SUMMARY AND OBJECT OF THE INVENTION

An object of the present invention is efficiently print 1-byte characters as well as 2-byte characters in such a manner that a size of a 2-byte character is smaller than twice the size of a 1-byte character. That is, since an interval between a 1-byte character and a 2-byte character is adjusted, the apparent size of the 2-byte character containing this adjusted character interval twice the size of the 1-byte character.

A printer printing control apparatus, according to a first aspect of the present invention, used in a printer for printing out 1-byte characters and 2-byte characters with a size ratio of 1:n (n<2) in a mixed form, is comprised of:

a printer driver for expanding intervals between said 1-byte characters and said 2-byte characters to print out said 1-byte characters and said 2-byte characters with an apparent size ratio of 1:2 in the mixed form, said apparent size containing the character interval in addition to the sizes of said 1-byte character and said 2-byte character.

A printer printing control apparatus, according to a second aspect of the present invention, as recited in the first aspect of the invention, is further comprised of:

input means for sequentially reading 1-byte data from a data stream; and 1-byte character output means for adding a kanji-character out code indicative of an end of a 2-byte character to said read 1-byte character data when the data read by said input means corresponds to a 1-byte character, and when data sent to said printer driver in the previous operation corresponds to a 2-byte character, and for transferring said code-added 1-byte character data to said printer driver.

A printer printing control apparatus, according to a third aspect of the present invention, as recited in the second aspect of the invention, is featured by that:

when the data read by said input means corresponds to a 1-byte character, and the data sent to said printer driver in the previous operation corresponds to a 1-byte character, said 1-byte character output means directly sends the read 1-byte character data to said printer driver.

A printer printing control apparatus, according to a fourth aspect of the present invention, as recited in the third aspect of the invention, is featured by that:

when the data read by said input means corresponds to a code for controlling a half-sized kana character, said 1-byte character output means discards said read data and 1-byte data is further read from the data stream by said input means; and when the data sent to said printer driver in the previous operation corresponds to a 2-byte character, said 1-byte character output means adds a kanji-character out code indicative of an end of a 2-byte character to said read 1-byte character data, and transfers the code-added 1-byte character data to said printer driver.

A printer printing control apparatus, according to a fifth aspect of the present invention, as recited in the fourth aspect of the invention, is featured by that:

when the data read by said input means corresponds to a code for controlling a half-sized kana character, said 1-byte character output means discards said read data and 1-byte data is further read from the data stream by said input means; and when the data sent to said printer driver in the previous operation corresponds to a 1-byte character, said 1-byte character output means directly transfers the read 1-byte character data to said printer driver.

A printer printing control apparatus, according to a sixth aspect of the present invention, as recited in the fifth aspect of the invention, is further comprised of:

2-byte character output means, wherein:

when the data read by said input means corresponds to a portion of a 2-byte character, 1-byte data is further read from the data stream by said input means and said 2-byte character output means combines said read 1-byte data with said data read in the previous operation to constitute a 2-byte character; and when the data sent to said printer driver in the previous operation corresponds to a 1-byte character, said 2-byte character output means adds a kanji-character in code indicative of a start of a 2-byte character and also a character interval code for controlling a character interval to said 2-byte character data, and transfers said code-added 2-byte character data to said printer driver.

A printer printing control apparatus, according to a seventh aspect of the present invention, as recited in the sixth aspect of the invention, is featured by that:

when the data read by said input means corresponds to a portion of a 2-byte character, 1-byte data is further read from the data stream by said input means and said 2-byte character output means combines said read 1-byte data with said data read in the previous operation to constitute a 2-byte character; and when the data sent to said printer driver in the previous operation corresponds to a 2-byte character, said 2-byte character output means directly transfers said sent 2-byte character data to said printer driver.

A printer printing control method, according to a first aspect of the present invention, used in a printer for printing out 1-byte characters and 2-byte characters with a size ratio of 1:n (n<2) in a mixed form, is comprised of:

a printer control step for expanding intervals between said 1-byte characters and said 2-byte characters to print out said 1-byte characters and said 2-byte characters with an apparent size ratio of 1:2 in the mixed form, said apparent size containing the character interval in addition to the sizes of said 1-byte character and said 2-byte character.

A printer printing control method, according to a second aspect of the present invention, as recited in the first aspect of the invention, is further comprised of:

an input step for sequentially reading 1-byte data from a data stream; and a 1-byte character output step for adding a kanji-character out code indicative of an end of a 2-byte character to said read 1-byte character data when the data read in said input step corresponds to a 1-byte character, and when data sent to said printer control step in the previous operation corresponds to a 2-byte character, and for transferring said code-added 1-byte character data to said printer control step.

A printer printing control method, according to a third aspect of the present invention, as recited in the second aspect of the invention, is featured by that:

when the data read in said input step corresponds to a 1-byte character, and the data sent to said printer control step in the previous operation corresponds to a 1-byte character, said 1-byte character output step directly sends the read 1-byte character data to said printer control step.

A printer printing control method, according to a fourth aspect of the present invention, as recited in the third aspect of the invention, is featured by that:

when the data read in said input step corresponds to a code for controlling a half-sized kana character, said 1-byte character output step discards said read data and 1-byte data is further read from the data stream in said input step; and when the data sent to said printer control step in the previous operation corresponds to a 2-byte character, said 1-byte character output step adds a kanji-character out code indicative of an end of a 2-byte character to said read 1-byte character data, and transfers the code-added 1-byte character data to said printer control step.

A printer printing control method, according to a fifth aspect of the present invention, as recited in the fourth aspect of the invention, is featured by that:

when the data read in said input step corresponds to a code for controlling a half-sized kana character, said 1-byte character output step discards said read data and 1-byte data is further read from the data stream in said input step; and when the data sent to said printer control step in the previous operation corresponds to a 1-byte character, said 1-byte character output step directly transfers the read 1-byte character data to said printer control step.

A printer printing control method, according to a sixth aspect of the present invention, as recited in the fifth aspect of the invention, is further comprised of:

a 2-byte character output step, wherein:

when the data read in said input step corresponds to a portion of a 2-byte character, 1-byte data is further read from the data stream in said input step and said 2-byte character output step combines said read 1-byte data with said data read in the previous operation to constitute a 2-byte character; and when the data sent to said printer control step in the previous operation corresponds to a 1-byte character, said 2-byte character output step adds a kanji-character in code indicative of a start of a 2-byte character and also a character interval code for controlling a character interval to said 2-byte character data, and transfers said code-added 2-byte character data to said printer control step.

A printer printing control method, according to a seventh aspect of the present invention, as recited in the sixth aspect of the invention, is featured by that:

when the data read in said input step corresponds to a portion of a 2-byte character, 1-byte data is further read from the data stream in said input step and said 2-byte character output step combines said read 1-byte data with said data read in the previous operation to constitute a 2-byte character; and when the data sent to said printer control step in the previous operation corresponds to a 2-byte character, said 2-byte character output step directly transfers said sent 2-byte character data to said printer control step.

In a memory medium, according to a first aspect of the present invention, for storing a printer printing control program capable of executing a process operation comprising the following step with respect to a printer for printing out 1-byte characters and 2-byte characters with a size ratio of 1:n (n<2) in a mixed form, the process operation is comprised of:

a printer control step for expanding intervals between said 1-byte characters and said 2-byte characters to print out said 1-byte characters and said 2-byte characters with an apparent size ratio of 1:2 in the mixed form, said apparent size containing the character interval in addition to the sizes of said 1-byte character and said 2-byte character.

In a memory medium, according to a second aspect of the present invention for storing a printer printing control program capable of performing a process operation comprising the following step, as recited in the first aspect of the invention, the process operation is further comprised of:

an input step for sequentially reading 1-byte data from a data stream; and a 1-byte character output step for adding a kanji-character out code indicative of an end of a 2-byte character to said read 1-byte character data when the data read in said input step corresponds to a 1-byte character, and when data sent to said printer control step in the previous operation corresponds to a 2-byte character, and for transferring said code-added 1-byte character data to said printer control step.

In a memory medium, according to a third aspect of the present invention, for storing a printer printing control program capable of performing a process operation comprising the following step, as recited in the second aspect of the invention, the process operation is featured by that:

when the data read in said input step corresponds to a 1-byte character, and the data sent to said printer control step in the previous operation corresponds to a 1-byte character, said 1-byte character output step directly sends the read 1-byte character data to said printer control step.

In a memory medium, according to a fourth aspect of the present invention, for storing a printer printing control program capable of performing a process operation comprising the following step, as recited in the third aspect of the invention, the process operation is featured by that:

when the data read in said input step corresponds to a code for controlling a half-sized kana character, said 1-byte character output step discards said read data and 1-byte data is further read from the data stream in said input step; and when the data sent to said printer control step in the previous operation corresponds to a 2-byte character, said 1-byte character output step adds a kanji-character out code indicative of an end of a 2-byte character to said read 1-byte character data, and transfers the code-added 1-byte character data to said printer control step.

In a memory medium, according to a fifth aspect of the present invention, for storing a printer printing control program capable of performing a process operation comprising the following step, as recited in the fourth aspect of the invention, the process operation is featured by that:

when the data read in said input step corresponds to a code for controlling a half-sized kana character, said 1-byte character output step discards said read data and 1-byte data is further read from the data stream in said input step; and when the data sent to said printer control step in the previous operation corresponds to a 1-byte character, said 1-byte character output step directly transfers the read 1-byte character data to said printer control step.

In a memory medium, according to a sixth aspect of the present invention, for storing a printer printing control program capable of performing a process operation comprising the following step, as recited in the fifth aspect of the invention, the process operation is further comprised of:

a 2-byte character output step, wherein:

when the data read in said input step corresponds to a portion of a 2-byte character, 1-byte data is further read from the data stream in said input step and said 2-byte character output step combines said read 1-byte data with said data read in the previous operation to constitute a 2-byte character; and when the data sent to said printer control step in the previous operation corresponds to a 1-byte character, said 2-byte character output step adds a kanji-character in code indicative of a start of a 2-byte character and also a character interval code for controlling a character interval to said 2-byte character data, and transfers said code-added 2-byte character data to said printer control step.

In a memory medium, according to a seventh aspect of the present invention, for storing a printer printing control program capable of performing a process operation comprising the following step, as recited in the sixth aspect of the invention, the process operation is featured by that:

when the data read in said input step corresponds to a portion of a 2-byte character, 1-byte data is further read from the data stream in said input step and said 2-byte character output step combines said read 1-byte data with said data read in the previous operation to constitute a 2-byte character; and when the data sent to said printer control step in the previous operation corresponds to a 2-byte character, said 2-byte character output step directly transfers said sent 2-byte character data to said printer control step.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

Here it should be noted that the like reference numerals represent like elements throughout the disclosure.

DETAILED DESCRIPTION OF THE PREFERRED EMBODIMENTS

Referring now to drawings, various embodiments of the present invention will be described in detail.

Figure 1:
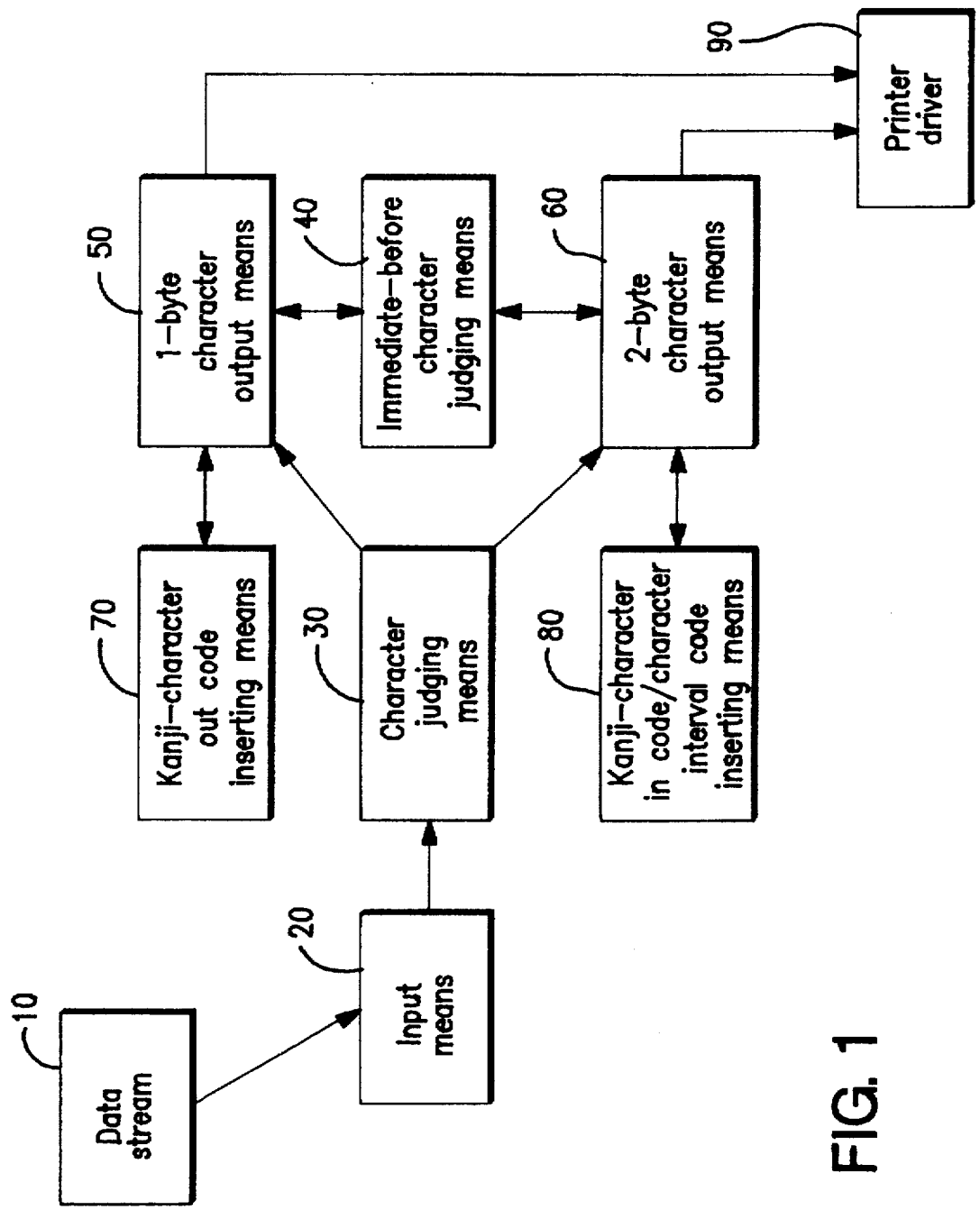
FIG. 1 is a schematic block diagram representing an arrangement of a printer printing control apparatus according to an embodiment of the present invention.

FIG. 1 schematically shows an arrangement of a printer printing control apparatus according to an embodiment of the present invention.

The arrangement of this printer printing control apparatus will now be explained with reference to FIG. 1.

A stream 10 sends several tens to several hundreds of print data to an input means 20.

The input means 20 disassembles the print data in units of 1 byte, and then transfers the disassembled print data to a character judging means 30.

The character judging means 30 judges the read data as follows. If the read data is smaller than, or equal to "7e (hexadecimal number)" in the EUC code, then the character judging means 30 sends this read data to a 1-byte character output means 50. If the read data is equal to "SS2 (8e) (hexadecimal number)" in the EUC code (where "ss2" is a code for controlling a half-sized kana character), then the character judging means 30 further reads another 1-byte data from the input means 20 and sends this 1-byte data to 1-byte character output means 50. When the read data is greater than, or equal to "a1 (hexadecimal number)" in the EUC code, another 1-byte data is furthermore read from the input means 20 to be combined with the read 1-byte data to thereby form 2-byte data. Moreover, 8080 (hexadecimal number) is subtracted from this 2-byte data, and the resultant data is transferred to a 2-byte character output means 60.

An immediate-before character judging means 40 stores whether data sent to a printer driver 90 in a previous operation corresponds to 1-byte data, or 2-byte data.

Upon receipt of the data sent from the character judging means 30, the 1-byte character output means 50 asks the immediate-before character judging means 40 whether the data sent to the printer driver 90 in the previous operation was 1-byte data, or 2-byte data. If the previously sent data was 1-byte data, then the 1-byte character output means 50 supplies the received 1-byte data to the printer driver 90. If the previously sent data was 2-byte data, then the 1-byte character output means 50 sends the received 1-byte data to a kanji-character out code inserting means 70, and then sends the data returned from inserting means 70 to the printer driver 90.

Upon receipt of the data sent from the character judging means 30, the 2-byte character output means 60 asks the immediate-before character judging means 40 whether the data sent to the printer driver 90 in the previous operation was 1-byte data, or 2-byte data. If the previously sent data was 1-byte data, then the 2-byte character output means 60 supplies the received 2-byte data to a kanji-character in code/character interval code inserting means 80, and then sends the data returned from inserting means 80 to the printer driver 90. When the previously sent data was 2-byte data, the 2-byte character output means 60 sends the received 2-byte data to the printer driver 90.

A kanji-character out code inserting means 70 inserts a kanji-character out code "1a71 (hexadecimal number)" indicative of an end of a 2-byte character immediately before the received data, and then returns the code-inserted data to the 1-byte character output means 50.

The kanji-character in code/character interval code inserting means 80 inserts both a kanji-character in code "1a70 (hexadecimal number)" representative of a start of a 2-byte character and a character interval code (1a242470 (hexadecimal number), or 1a242478 (hexadecimal number) immediately before the received data, and then returns the code-inserted data to the 2-byte character output means 60. The character interval code is a code for sending a command to the printer that adjusts an interval of a character. The selection of this character interval code depends upon sorts of printers and fonts being used.

The printer driver 90 is an operating system for forming printer control data used to print such data sent from the 1-byte character output means 50, or the 2-byte character output means 60. It should be understood that since the process operation for forming the printer control data by the printer driver 90 is not directly related to the feature of the present invention, more detailed explanations about this printer driver 90 are omitted.

Figure 2:
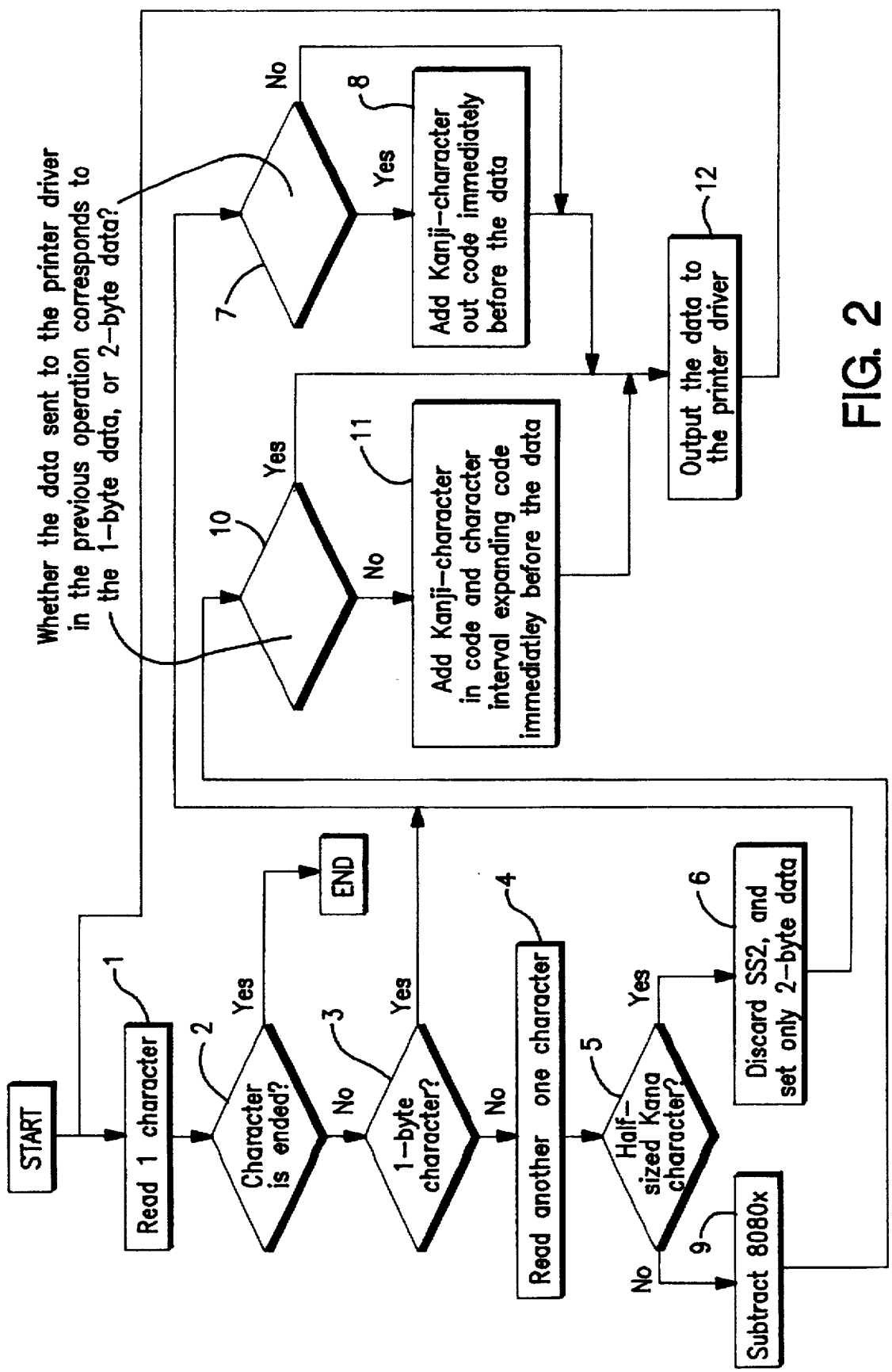
FIG. 2 is a flow chart describing process operations of the input means 20, character judging means 30, 1-byte character output means 50, 2-byte character output means 60, kanji-character out inserting means 70, and kanji-character in/character interval code inserting means 80 employed in the printer printing control apparatus of FIG. 1.

Referring now to FIG. 1 and FIG. 2, operation of the printer printing control apparatus with the above-described arrangement according to one embodiment will be described.

In the printer printing control apparatus, the input means 20 disassembles the print data received from the stream 10 in units of 1 byte (step 1). At this step, if no print data is received from the stream 10, then this print control process is ended (step 2).

The character judging means 30 judges whether the 1-byte data received from the input means 20 corresponds to the 1-byte character (smaller than, or equal to "7e (hexadecimal number)" in EUC code, or "SS2 (8e) (hexadecimal number)" in EUC code), or the 2-byte character (greater than, or equal to "a1 (hexadecimal number)" in EUC code) (step 3).

In the event the character judging means 30 judges at the step 3 that the 1-byte data received from the input means 20 corresponds to a 1-byte character, the 1-byte character output means 50 asks the immediate-before character judging means 40 whether the data sent to the printer driver 90 in the previous operation was 1-byte data or 2-byte data (step 7). When this previously sent data was 1-byte data, the 1-byte data is transferred to the printer driver 90 by the 1-byte character output means 50 (step 12). When previously sent data was 2-byte data, the kanji-character out code inserting means 70 inserts the kanji-character out code "1a71 (hexadecimal number)" indicative of the end of the 2-byte character immediately before this 1-byte data (step 8), and the 1-byte character output means 50 sends the code-inserted data to the printer driver 90 (step 12). Then, the process operation is returned to the step 1.

When the character judging means 30 judges at the step 3 that the 1-byte data received from the input means 20 corresponds to "SS2", the character judging means 30 further reads 1-byte data from the input means 20 (step 4), and discards "SS2" (step 6), and then transfers only the data read at the step 4 to the 1-byte character output means 50 (to a step 7).

When the character judging means 30 judges at the step 3 that the 1-byte data received from the input means 20 in a part of a 2-byte character, the character judging means 30 reads another 1-byte data from the input means 20 (step 4), and combines this 1-byte read data with the previously data read at the step 3 to form the 2-byte character. This character judging means 30 subtracts "8080 (hexadecimal number)" from this 2-byte character (step 9), and thereafter sends the subtracted data to the 2-byte character output means 60.

Upon receipt of the data sent from the character judging means 30, the 2-byte character output means 60 asks the immediate-before character judging means 40 as to whether the data sent to the printer driver 90 in the previous operation was 1-byte data, or the 2-byte data (step 10). If the previously send data was 1-byte data, then the kanji-character in code/character interval code inserting means 80 inserts both the kanji-character in code "1a70 (hexadecimal number)" indicative of the start of the 2-byte character and the character interval code "1a242470 (hexadecimal number)" otherwise "1a242478 (hexadecimal number)" immediately before this 2-byte data (step 11). This code-inserted 2-byte data is sent to the printer driver 90 (step 12), and then the process operation is returned to the step 1.

When the interrogation result at the step 10 indicates that the previously sent data was 2-byte data, the 2-byte character output means 60 directly transfers the data received from the character judging means 30 to the printer 90 (step 12), and then the process operation is returned to the step 1.

With the above-described operations, the process operations of the printer printing control apparatus according to one embodiment of the present invention are complete.

As previously described in detail, the printer printing control apparatus of the present invention has the following advantages. In a printer capable of printing 1-byte characters as well as 2-byte characters in such a manner that a size of a 2-byte character is smaller than twice the size of a 1-byte character, between a 1-byte character and a 2-byte character is the apparent size of the 2-byte character containing this character interval is double the size of the 1-byte character since an interval between a 1-byte character and a 2-byte character is adjusted.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A printer printing control apparatus for adjusting a printing interval of a printer that prints 1-byte characters and 2-byte characters with a 1 to n ratio of a printed width of the 1-byte characters to a printed width of the 2-byte characters, 1<n<2, the apparatus comprising a printer driver for expanding a character interval adjacent each of the 2-byte characters so that a ratio of the printed width of the 1-byte characters to the printed width of the 2-byte characters plus the interval is 1 to 2.

2. The apparatus of claim 1, further comprising,
an input means for sequentially reading an input stream of characters in one byte units,
means for indicating whether a character in the stream of characters is immediately preceded by one of the 1-byte characters or one of the 2-byte characters, and a first character output means for adding to a beginning of a 1-byte character in the stream of characters an out code indicating an end of a 2-byte character when the immediately preceding character in the stream of characters was a 2-byte character, and for transferring the code-added 1-byte character to said printer driver.

3. The apparatus of claim 2, wherein said first character output means is for transferring a 1-byte character in the stream of characters to said printer driver without said out code when the immediately preceding character in the stream of characters was a 1-byte character.

4. The apparatus of claim 2, wherein said first character output means is for replacing a character in the stream of characters with a character immediately following in the stream of characters when the replaced character is a code for controlling a character of other than 1 or 2-bytes.

5. The apparatus of claim 1, further comprising, an input means for sequentially reading an input stream of characters in one byte units, means for indicating whether a character in the stream of characters is immediately preceded by one of the 1-byte characters or one of the 2-byte characters, and a second character output means for adding to a beginning of a 2-byte character in the stream of characters (a) an in code indicating a beginning of a 2-byte character, and (b) a character interval code for expanding an interval adjacent a 2-byte character, when the immediately preceding character in the stream of characters was a 1-byte character, and for transferring the code-added 2-byte character to said printer driver.

6. The apparatus of claim 5, wherein said second character output means is for transferring a 2-byte character in the stream of characters to said printer driver without said in code and without said interval code when the immediately preceding character in the stream of characters was a 2-byte character.

7. A method of adjusting a printing interval of a printer that prints 1-byte characters and 2-byte characters with a 1 to n ratio of a printed width of the 1-byte characters to a printed width of the 2-byte characters, $1<n<2$, the method comprising expanding in a printer driver a character interval adjacent each of the 2-byte characters so that a ratio of the printed width of the 1-byte characters to the printed width of the 2-byte characters plus the interval is 1 to 2.

8. The method of claim 7, further comprising, sequentially reading an input stream of characters in one byte units, indicating whether a character in the stream of characters is immediately preceded by one of the 1-byte characters or one of the 2-byte characters, adding to a beginning of a 1-byte character in the stream of characters an out code indicating an end of a 2-byte character when the immediately preceding character in the stream of characters was a 2-byte character, and transferring the code-added 1-byte character to the printer driver.

9. The method of claim 8, further comprising transferring a 1-byte character in the stream of characters to the printer driver without an out code when the immediately preceding character in the stream of characters was a 1-byte character.

10. The method of claim 8, further comprising replacing a character in the stream of characters with a character immediately following in the stream of characters when the replaced character is a code for controlling a character of other than 1 or 2-bytes.

11. The method of claim 7, further comprising, sequentially reading an input stream of characters in one byte units, indicating whether a character in the stream of characters is immediately preceded by one of the 1-byte characters or one of the 2-byte characters, adding to a beginning of a 2-byte character in the stream of characters (a) an in code indicating a beginning of a 2-byte character, and (b) a character interval code for expanding an interval adjacent a 2-byte character, when the immediately preceding character in the stream of characters was a 1-byte character, and transferring the code-added 2-byte character to the printer driver.

12. The method of claim 11, further comprising transferring a 2-byte character in the stream of characters to the printer driver without the in code and without the interval code when the immediately preceding character in the stream of characters was a 2-byte character.

13. A memory medium for storing a printer printing control program for executing a process operation including the following step with respect to a printer that prints 1-byte characters and 2-byte characters with a 1 to n ratio of a printed width of the 1-byte characters to a printed width of the 2-byte characters, $1<n<2$, the memory medium storing the step of expanding in a printer driver a character interval adjacent each of the 2-byte characters so that a ratio of the printed width of the 1-byte characters to the printed width of the 2-byte characters plus the interval is 1 to 2.

14. The memory medium of claim 13, further storing the steps of, sequentially reading an input stream of characters in one byte units, indicating whether a character in the stream of characters is immediately preceded by one of the 1-byte characters or one of the 2-byte characters, adding to a beginning of a 1-byte character in the stream of characters an out code indicating an end of a 2-byte character when the immediately preceding character in the stream of characters was a 2-byte character, and transferring the code-added 1-byte character to the printer driver.

15. The memory medium of claim 14, further storing the step of transferring a 1-byte character in the stream of characters to the printer driver without an out code when the immediately preceding character in the stream of characters was a 1-byte character.

16. The memory medium of claim 14, further storing the step of replacing a character in the stream of characters with a character immediately following in the stream of characters when the replaced character is a code for controlling a character of other than 1 or 2-bytes.

17. The memory medium of claim 13, further storing the steps of, sequentially reading an input stream of characters in one byte units, indicating whether a character in the stream of characters is immediately preceded by one of the 1-byte characters or one of the 2-byte characters, adding to a beginning of a 2-byte character in the stream of characters (a) an in code indicating a beginning of a 2-byte character, and (b) a character interval code for expanding an interval adjacent a 2-byte character, when the immediately preceding character in the stream of characters was a 1-byte character, and transferring the code-added 2-byte character to the printer driver.

18. The memory medium of claim 17, further storing the step of transferring a 2-byte character in the stream of characters to the printer driver without the in code and without the interval code when the immediately preceding character in the stream of characters was a 2-byte character.

* * * * *